United States Patent
Bernard et al.

(10) Patent No.: US 6,455,197 B1
(45) Date of Patent: Sep. 24, 2002

(54) POSITIVE ACTIVE MATERIAL FOR ALKALINE ELECTROLYTE STORAGE BATTERY NICKEL ELECTRODES

(75) Inventors: Patrick Bernard, Massy; Michelle Baudry, Le Pontaroux, both of (FR)

(73) Assignee: Alcatel Alsthom Compagnie Generale d'Electricite, Paris (FR)

( * ) Notice: Subject to any disclaimer, the term of this patent is extended or adjusted under 35 U.S.C. 154(b) by 83 days.

(21) Appl. No.: 09/643,867

(22) Filed: Aug. 23, 2000

Related U.S. Application Data

(63) Continuation of application No. 09/034,998, filed on Mar. 5, 1998, now Pat. No. 6,156,454.

(30) Foreign Application Priority Data

Mar. 6, 1997 (FR) .............................................. 97 02673

(51) Int. Cl.$^7$ ................................................. H01M 4/52
(52) U.S. Cl. ..................................... 429/223; 429/218.1
(58) Field of Search ............................... 429/223, 218.1

(56) References Cited

U.S. PATENT DOCUMENTS

| | | | | |
|---|---|---|---|---|
| 5,466,543 A | * | 11/1995 | Ikoma | .......................... 429/59 |
| 5,506,076 A | | 4/1996 | Miyamoto et al. | |
| 5,549,992 A | | 8/1996 | Iwane | ........................ 429/233 |
| 5,707,764 A | | 1/1998 | Miyamoto | ................... 429/223 |
| 5,804,334 A | | 9/1998 | Yamamura | ................... 429/218 |
| 5,905,003 A | | 5/1999 | Young | .......................... 429/223 |
| 5,968,684 A | * | 10/1999 | Hayashi | ....................... 429/223 |
| 6,077,625 A | * | 6/2000 | Yano | ........................... 429/223 |
| 6,156,454 A | * | 12/2000 | Bernard | ....................... 429/223 |

FOREIGN PATENT DOCUMENTS

| | | | | | |
|---|---|---|---|---|---|
| JP | 410021909 A | * | 1/1998 | ............ | H01M/4/52 |
| JP | 410270040 A | * | 10/1998 | ............ | H01M/4/32 |
| JP | 2000277105 A | * | 10/2000 | ............ | H01M/4/32 |

OTHER PUBLICATIONS

Patent Abstracts of Japan, vol. 097, No. 004, Apr. 30, 1997 corresponding to JP 08 329937 A, (Matsushita Electric Ind Co., Ltd) Dec. 13, 1996.

Patent Abstracts of Japan, vol. 096, No. 006, Jun. 28, 1996 corresponding to JP 08 045508 A, (Sumitomo Metal Mining Co, Ltd) Feb. 16, 1996.

* cited by examiner

*Primary Examiner*—Patrick Ryan
*Assistant Examiner*—Mark Ruthkosky
(74) *Attorney, Agent, or Firm*—Sughrue Mion, PLLC

(57) ABSTRACT

A positive active material for nickel electrodes of alkaline storage batteries consists of particles of hydroxide containing mainly nickel and covered with a layer of a hydroxide phase based on nickel and yttrium. The proportion of the hydroxide phase is in the range 0.15% to 3% by weight of yttrium expressed as yttrium hydroxide relative to the total weight of particles.

10 Claims, 1 Drawing Sheet

POSITIVE ACTIVE MATERIAL FOR ALKALINE ELECTROLYTE STORAGE BATTERY NICKEL ELECTRODES

This is a Continuation of application Ser. No. 09/034,998 now U.S. Pat. No. 6,156,454 filed Mar. 5, 1998, the disclosure of which is incorporated herein by reference.

BACKGROUND OF THE INVENTION

1. Field of the Invention

The present invention concerns a positive active material for nickel electrodes for alkaline electrolyte storage batteries. It also extends to the method of preparing the active material and to its use in the manufacture of the electrode

2. Description of the Prior Art

Most recent applications of alkaline electrolyte storage batteries oblige the user to charge the batteries at temperatures higher than room temperature. This is the case when the storage batteries are used in vehicle traction, for example. When the charging temperature is in the order of 40° C. to 60° C., the efficiency of charging the positive electrode is poor because the oxygen release excess voltage at the end of charge is low.

U.S. Pat. No. 5,466,543 describes a paste type electrode for alkaline storage batteries adapted to operate over a wide range of temperatures. The paste contains an active material and at least one compound of yttrium, indium, antimony, barium, beryllium and at least one compound of cobalt or calcium.

European patent application 0 634 804 proposes a paste comprising a mixture of active materials consisting mainly of nickel hydroxide and containing at least one element selected from cobalt, cobalt hydroxide, cobalt oxide, carbon and nickel and a powder compound of at least one element chosen from Ca, Sr, Ba, Cu, Ag and Y.

The efficiency obtained with such electrodes is still insufficient for some applications. These poor results are associated with unsuitable distribution of the substances in the paste and the formation of lumps which renders some of the additives ineffective.

SUMMARY OF THE INVENTION

The present invention consists in a positive active material for nickel electrodes for alkaline storage batteries consisting of particles of hydroxide containing mainly nickel and covered with a layer of a hydroxide phase based on nickel and yttrium, the proportion of the hydroxide phase being in the range 0.15% to 3% by weight of yttrium expressed as yttrium hydroxide relative to the total weight of particles.

Because the hydroxide particles are coated with the layer of the hydroxide phase, the latter is distributed in a highly homogeneous manner throughout the active material, which cannot be achieved with the mixtures of powders of the prior art. Moreover, the phase can exert its influence on each hydroxide particle, with maximum efficiency.

It is therefore possible to minimize the quantity of the hydroxide phase to be used, enabling the electrode to retain a high level of filling with electrochemically active material and therefore a high energy per unit volume.

Accordingly, from 0.15% by weight of yttrium relative to the total weight of particles, the efficiency of the active material is significantly increased, in particular when charging at high temperature.

Beyond 3% by weight, this improvement is canceled out by the reduced proportion of electrochemically active material, the yttrium contained in the hydroxide phase not contributing to the electrochemical reactions.

The hydroxide phase is preferably of the hydrotalcite type with indexed lattice parameters in the hexagonal system $a=3.122$ Å$\pm 0.01$ Å and $c=7.567$ Å$\pm 0.01$ Å.

The hydroxide phase can further contain at least one element such as cobalt co-crystallized with the nickel and the yttrium.

The hydroxide phase containing nickel and yttrium preferably also occupies at least part of the surface microporosity of the hydroxide particle. This is the microporosity accessible to the electrolyte and which contributes to the electrochemically active surface area of the hydroxide.

The hydroxide particles can be of any shape, from a more or less spherical shape to a totally irregular shape.

The hydroxide of the particles advantageously further contains in solid solution at least one hydroxide selected from the hydroxides of cobalt, aluminum, iron, copper, chromium and manganese and at least one hydroxide selected from the hydroxides of cadmium, zinc and magnesium.

In this case the hydroxide particles still contain mainly nickel and usually a minor proportion, not exceeding 20%, of hydroxide of one or more of the other co-crystallized elements. The crystallized structure of the hydroxide is not modified.

The present invention also consists in a method of manufacturing the above active material comprising the following steps:

a solution is prepared containing yttrium ions and nitrate ions, the hydroxide particles are immersed in the solution, the particles are separated from the solution and the particles are drained, the hydroxide particles are immersed in an alkaline solution, the particles are separated from the alkaline solution, and the particles are washed with water and dried.

Of course, by "hydroxide particles" we mean particles in which the hydroxide contains mainly nickel but also the previously mentioned co-crystallized hydroxides.

The solution containing yttrium ions is preferably a solution of yttrium nitrate, but can be selected from a mixture of a solution of potassium nitrate, sodium nitrate or lithium nitrate and a solution of yttrium sulfate, yttrium chloride or yttrium acetate.

The alkaline solution is preferably selected from sodium hydroxide NaOH, potassium hydroxide KOH and lithium hydroxide LiOH.

A time of contact with the alkaline solution in the range 30 minutes to five hours is sufficient, but the immersion time can be as much as 48 hours without disadvantage.

The drying temperature is in the range 40° C. to 110° C. for a time in the range 12 hours to 48 hours.

The present invention also consists in an alkaline storage battery positive electrode using the above active material; an electrode of this kind comprises a conductive support and a paste containing a binder, a conductive powder and the active material of the invention.

The support is a porous three-dimensional conductive support such as a nickel sponge.

The binder includes at least one compound selected from carboxymethylcellulose CMC, hydroxyethylcellulose HEC, hydroxypropylmethylcellulose HPMC and at least one compound chosen from polytetrafluoroethylene PTFE and polyvinylidene fluoride PVDF.

The conductive powder is chosen from metallic cobalt Co, cobalt hydroxide Co(OH)$_2$, cobalt oxide CoO and mixtures thereof.

An electrode in accordance with the invention can be used in any alkaline storage battery and in particular in storage batteries having cadmium or hydridable alloy negative electrodes.

Other features and advantages of the present invention will become apparent from the following examples given by way of illustrative and non-limiting example and from the appended drawing.

DETAILED DESCRIPTION OF THE PREFERRED EMBODIMENTS

EXAMPLE 1

A prior art standard nickel electrode A was made using a conductive support in the form of nickel sponge with a porosity of approximately 95% and a paste.

The composition by weight of the paste was as follows:

Powdered electrochemically active material comprising a hydroxide comprising 93% by weight of nickel hydroxide, 4% by weight of zinc hydroxide and 3% by weight of cobalt hydroxide, co-crystallized: 66%

Conductive powder comprising a mixture of cobalt hydroxide CO(OH)$_2$ and metallic cobalt: 7%

Binder comprising a mixture of a cellulosic binder and PTFE: 1.6%

Water: 25.4%

When the paste had been incorporated into the support the electrode was dried to eliminate the water.

EXAMPLE 2

An electrochemically active powder in accordance with the present invention was prepared in the following manner. Hydroxide powder comprising 93% by weight of nickel hydroxide, 4% by weight of zinc hydroxide and 3% by weight of cobalt hydroxide, co-crystallized, was placed in suspension in a 0.25 M solution of yttrium acetate and maintained at 80° C. The powder was left in contact with the solution for approximately six hours. The particles were then drained to eliminate excess solution. The powder was then immersed in a 1.5 M concentration of sodium hydroxide NaOH at room temperature for one hour. The powder was finally washed at room temperature using distilled water buffered to a pH of 9 and then dried at a temperature in the order of 70° C. This method produced starting hydroxide particles coated with a layer of yttrium hydroxide in which the yttrium represented 0.4% by weight of the total weight of the final particle. This active material was used to manufacture an electrode B similar to that prepared in example 1.

Figure 1:
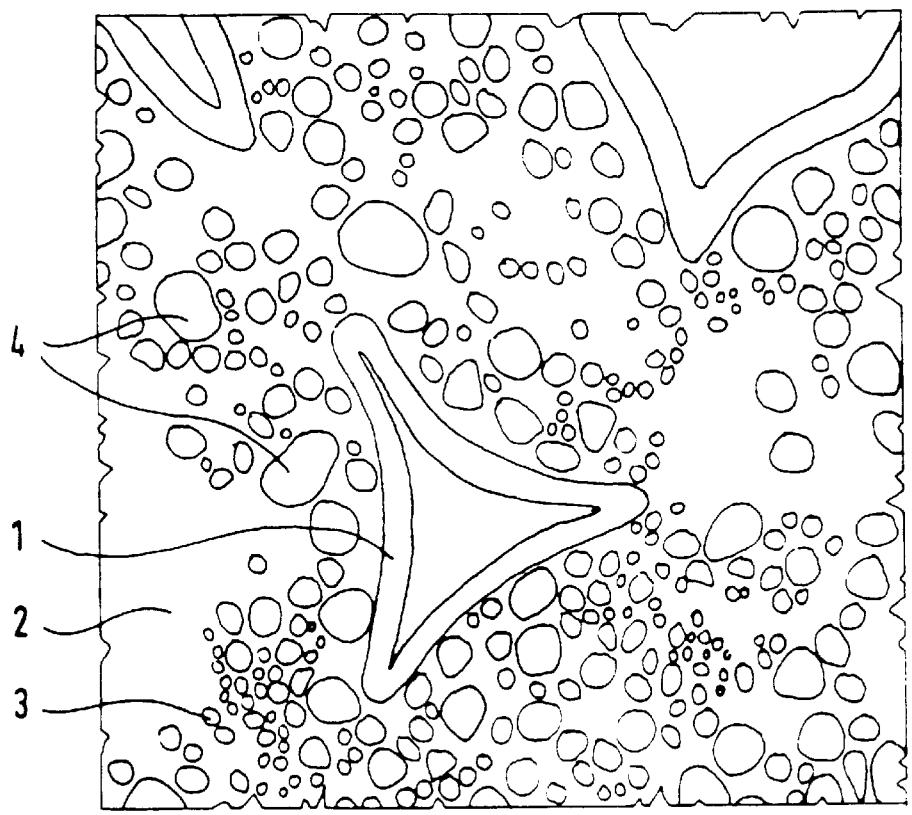
FIG. 1 is a schematic sectional view of part of a paste type electrode containing hydroxide particles coated with a hydroxide phase based on nickel and yttrium in accordance with the present invention.
Figure 2:
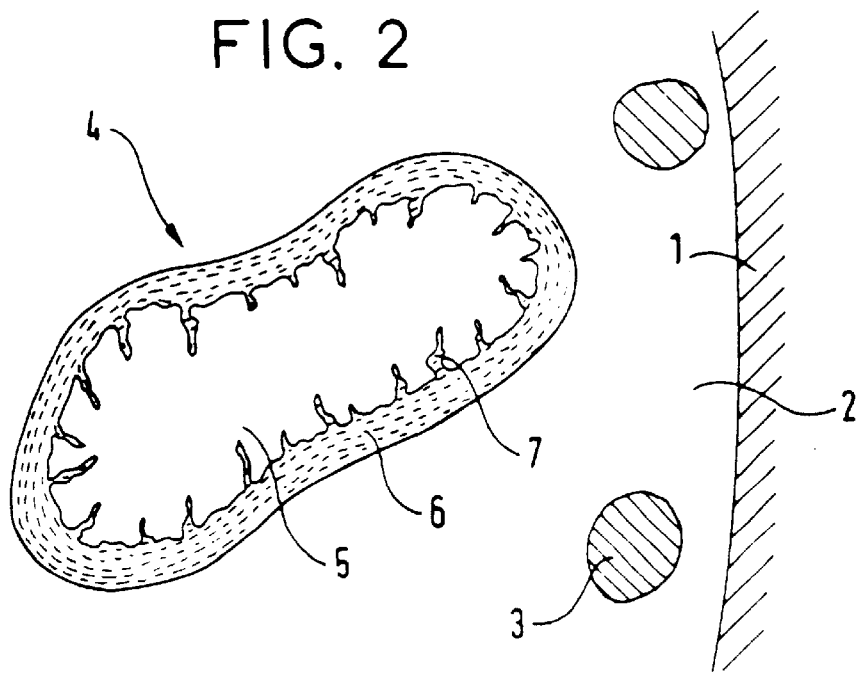
FIG. 2 is a schematic sectional view to a larger scale of a hydroxide particle coated with a hydroxide phase based on nickel and yttrium in accordance with the present invention.

FIG. 1 shows a schematic sectional view of part of an electrode of this kind. The porous conductive support 1 filled with paste containing the binder 2, the conductive powder 3 and the electrochemically active material particles 4 can be seen. FIG. 2 is a schematic sectional view to a larger scale of an active material particle 4 in accordance with the invention and shows the starting hydroxide particle 5 coated with a continuous layer 6 of a hydroxide phase based on nickel and yttrium, this layer penetrating partly into the surface porosity 7 of the hydroxide 5.

EXAMPLE 3

Another electrochemically active powder in accordance with the present invention was prepared in the following manner. Hydroxide powder comprising 93% by weight of nickel hydroxide, 4% by weight of zinc hydroxide and 3% by weight of cobalt hydroxide, co-crystallized, was placed in suspension in a 0.006 M solution of yttrium nitrate and maintained at 80° C. The powder was left in contact with the solution for approximately five hours. The particles were then drained to eliminate excess solution. The powder was then immersed in a 1.5 M sodium hydroxide NaOH solution at room temperature for one hour. The powder was finally washed at room temperature using distilled water buffered to a pH of 9 and then dried at a temperature in the order of 70° C. Starting hydroxide particles were obtained by this method coated with a layer of a hydrotalcite type phase comprising a hydroxide based on nickel and yttrium in which the yttrium represented 0.4% by weight of the total weight of the final particle.

An electrode C similar to that prepared in example 1 was made with this active material.

EXAMPLE 4

An electrochemically active powder in accordance with the present invention was prepared by the method described in example 3 but using a 0.025 M solution of yttrium nitrate.

Starting hydroxide particles were obtained by this method coated with a layer of a hydrotalcite type phase comprising a hydroxide based on nickel and yttrium in which the yttrium represented 0.65% by weight of the total weight of the final particle.

An electrode D similar to that prepared in example 1 was made with this active material.

EXAMPLE 5

An electrochemically active powder in accordance with the present invention was prepared by the method described in example 3 using a 0.2 M solution of yttrium nitrate.

Starting hydroxide particles were obtained by this method coated with a layer of a hydrotalcite type phase comprising a hydroxide based on nickel and yttrium in which the yttrium represented 1.5% by weight of the total weight of the final particle.

An electrode E similar to that prepared in example 1 was made with this active material.

EXAMPLE 6

Sealed nickel-metal hydride Ni—MH storage batteries were assembled each including one of the electrodes A, C, D, E previously prepared. Each positive electrode was placed against a prior art type hydridable alloy overcapacitive negative electrode. The positive and negative electrodes were separated by a layer of non-woven polypropylene. The electrode assembly was then impregnated with an alkaline electrolyte in the form of an aqueous solution of 7.4 N potassium hydroxide KOH, 0.5 N lithium hydroxide LiOH and 0.4 N sodium hydroxide NaOH.

After 48 hours rest the storage batteries were tested by cycling them at 20° C. under the following conditions, where Ic represents the theoretical current needed to discharge the storage battery in one hour:

Cycle 1:
 Charge at 0.1 Ic for 16 hours
 Discharge at 0.2 Ic to a cut-off voltage of 0.9 V;
Cycle 2:
 Charge at 0.1 Ic for 16 hours
 Discharge at 0.2 Ic to a voltage of 1 V;
Cycles 3–12:
 Identical to cycle 2 and carried out at 20° C.;
Cycle 13:
 Charge at 0.1 Ic for 16 hours at 45° C.
 Discharge at Ic to a cut-off voltage of 1 V;
Cycle 14:
 Charge at 0.1 Ic for 16 hours at 50° C.
 Discharge at Ic to a cut-off voltage of 1 V.

The calculated efficiencies are summarized in table I below.

TABLE I

| Efficiency (mAh/g) | A | C | D | E |
|---|---|---|---|---|
| Cycle 1 | 220 | 217 | 220 | 216 |
| Cycle 2 | 221 | 221 | 223 | 221 |
| Cycle 13 | 146 | 185 | 201 | 208 |
| Cycle 14 | 104 | 118 | 136 | 189 |

The storage battery containing electrode A had a 34% loss of capacity between 20° C. and 45° C. and a 53% loss of capacity between 20° C. and 50° C.

Compared to the storage battery containing the prior art electrode A, the efficiency of the storage battery containing electrode C in accordance with the invention was 26% higher at 45° C. and 13% higher at 50° C.

Compared to the storage battery containing the prior art electrode A, the efficiency of the storage battery containing electrode E in accordance with the invention was 42% higher at 45° C. and 82% higher at 50° C.

Of course, the present invention is not limited to the embodiments described in the examples, but is susceptible to many variants that will suggest themselves to the skilled person and do not depart from the scope of the invention. In particular, the composition of the hydroxide and the nature of the co-crystallized elements can be modified without departing from the scope of the invention. The composition of the hydrotalcite phase based on nickel and yttrium could be modified by incorporating other co-crystallized elements such as cobalt. Consideration could also be given to using a conductive electrode support of a different nature and structure, such as a metallic support or a carbon-based material support, for example felt, sponge, expanded metal or perforated strip. Finally, the various ingredients of the paste and their relative proportions could be changed. In particular, small proportions of additives intended to facilitate the shaping of the electrode could be incorporated, such as a thickener or a texture stabilizer.

There is claimed:

1. A positive active material comprising nickel hydroxide particles covered with a layer of a hydrotalcite nickel and yttrium hydroxide phase, said hydroxide phase having in the range of 0.15% to 3% by weight yttrium hydroxide relative to the total weight of said covered particles.

2. The positive active material claimed in claim 1 wherein said hydroxide phase further contains at least one element co-crystallized with the nickel and the yttrium.

3. The positive active material claimed in claim 1 wherein said phase containing nickel and yttrium also occupies at least part of the surface microporosity of said hydroxide particle.

4. The positive active material claimed in claim 1 wherein said hydroxide particles further contain in solid solution (A) at least one hydroxide selected from cobalt hydroxide, aluminum hydroxide, iron hydroxide, copper hydroxide, chromium hydroxide and manganese hydroxide and (B) at least one hydroxide selected from cadmium hydroxide, zinc hydroxide and magnesium hydroxide.

5. An electrode comprising (A) an active material as claimed in claim 1 and (B) a conductive support that is a nickel sponge.

6. The electrode of claim 5 wherein said electrode contains a binder comprising at least one compound selected from the group consisting of carboxymethylcellulose, hydroxyethylcellulose, hydroxypropylmethylcellulose and at least one compound chosen from the group consisting of polytetrafluoroethylene and polyvinylidene fluoride.

7. The positive active material of claim 2, wherein the co-crystallized element is cobalt.

8. An active material particle for a nickel electrode, comprising a nickel hydroxide particle covered with a layer of a nickel and yttrium hydroxide phase, the hydroxide phase having in the range of 0.15% to 3% by weight yttrium hydroxide relative to the total weight of said covered particles.

9. The positive active material of claim 1, wherein the hydroxide particles are prepared from a hydroxide powder comprising mainly nickel hydroxide and further comprising zinc hydroxide and cobalt hydroxide.

10. The positive active material of claim 9, wherein the hydroxide powder comprises 93% by weight of nickel hydroxide.

* * * * *

UNITED STATES PATENT AND TRADEMARK OFFICE
CERTIFICATE OF CORRECTION

PATENT NO. : 6,455,197 B1  
DATED : September 24, 2002  
INVENTOR(S) : Bernard, Patrick and Baudry, Michelle Page 1 of 1

It is certified that error appears in the above-identified patent and that said Letters Patent is hereby corrected as shown below:

<u>Title page,</u>
Item [73], should read:

-- [73] Assignee: Alcatel, Paris (FR) --

Signed and Sealed this

Sixth Day of May, 2003

JAMES E. ROGAN
*Director of the United States Patent and Trademark Office*